United States Patent
Choi et al.

(10) Patent No.: US 6,456,355 B1
(45) Date of Patent: Sep. 24, 2002

(54) LIQUID CRYSTAL PANEL HAVING A PLURALITY OF RIBS FOR A LIQUID CRYSTAL DISPLAY DEVICE

(75) Inventors: Suk-Won Choi; Su-Seok Choi, both of Gyeonggi-do (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/994,020

(22) Filed: Nov. 27, 2001

(30) Foreign Application Priority Data

Nov. 28, 2000 (KR) .......................................... 2000-71352

(51) Int. Cl.$^7$ ............................................. G02F 1/1375
(52) U.S. Cl. ........................ 349/153; 349/154; 349/189
(58) Field of Search ................................. 349/154, 189, 349/153

(56) References Cited

U.S. PATENT DOCUMENTS

| 5,798,813 A | * | 8/1998 | Ohashi et al. | ............... | 349/154 |
| 5,946,070 A | * | 8/1999 | Kohama et al. | ............ | 349/156 |
| 6,211,937 B1 | * | 4/2001 | Miyachi et al. | ............. | 349/156 |

* cited by examiner

*Primary Examiner*—James Dudek
(74) *Attorney, Agent, or Firm*—McKenna Long & Aldridge LLP

(57) ABSTRACT

A liquid crystal panel for the liquid crystal display device has a plurality of ribs disposed on an opposite internal edge to the injection hole in order to speed up the injection time of the liquid crystal and the ribs of the liquid crystal panel have a shape of the teeth of a comb.

23 Claims, 4 Drawing Sheets

LIQUID CRYSTAL PANEL HAVING A PLURALITY OF RIBS FOR A LIQUID CRYSTAL DISPLAY DEVICE

This application claims the benefit of Korean Patent Application No. 2000-71352, filed on Nov. 28, 2000 in Korea, which is hereby incorporated by reference as if fully set forth herein.

BACKGROUND OF THE INVENTION

1. Field of the Invention

The present invention relates to a liquid crystal display (LCD) device and more particularly, to a liquid crystal panel having ribs therein to reduce an injection time of liquid crystal.

2. Discussion of the Related Art

A typical liquid crystal display (LCD) panel has an upper substrate and a lower substrate and a liquid crystal layer interposed therebetween. More specifically, the upper substrate includes common electrodes, while the lower substrate includes switching elements, such as thin film transistors (TFTs), and pixel electrodes.

A manufacturing process and an operation of the liquid crystal cell will be described. Common electrodes and pixel electrodes are formed on upper and lower substrates, respectively. A seal is then formed on the lower substrate. The upper and lower substrates are then bonded together using a sealing material so that the common electrodes of the upper substrate and the pixel electrodes of the lower substrate face each other. Thereafter, liquid crystal panels are completed. A liquid crystal material is injected into a gap between the upper and lower substrates through injection holes. The injection holes are then sealed. Finally, polarizing films are attached to outer surfaces of the upper and lower substrates.

In operation of the liquid crystal panel, light passing through the liquid crystal panel is controlled by electric fields. The electric fields are applied through the pixel and common electrodes. By controlling the electric fields, desired characters or images are displayed on the panel.

Fabrication processes of various components of the liquid crystal display device, such as the thin film transistors or color filters, typically require numerous manufacturing steps. However, the overall fabrication process for the liquid crystal display device is relatively straightforward. FIG. 1 is a flow chart illustrating a fabricating sequence of the liquid crystal cell for the conventional liquid crystal display device. In the first step (ST1), the upper and lower substrates, i.e., a color filter substrate and an array substrate, are initially cleaned. The object of this process is to remove impurities that may exist on the substrate. At this time one or more cells have been already formed on the upper and lower substrates respectively.

In the second step (ST2), alignment layers are formed on the upper and lower substrates. The alignment layers are formed on the common and pixel electrodes. This step includes processes for coating an alignment layer, hardening and rubbing. A polyimide-based resin is usually selected for an alignment layer material because it exhibits good alignment characteristics with various liquid crystal materials. A surface of the hardened alignment layer is rubbed by a fabric in order to make scratches in a uniform direction. This rubbing process is needed in order to provide uniform alignment of the liquid crystal molecules and thus provide a display with uniform characteristics. Accordingly, it is very important to form the alignment layer uniformly on a large surface of electrodes.

In the third step (ST3), a seal pattern is printed and spacers are dispensed on the substrate. When the upper and lower substrates are attached, the seal patterns form cell gaps that will receive the liquid crystal material. The seal pattern also prevents the interposed liquid crystal material from leaking out of the completed liquid crystal cell. The seal is conventionally fabricated using thermosetting resin including glass fiber and screen-print technology. The seal pattern includes an injection hole and is formed along edges of a display area of each cell. After the seal pattern is printed, spacers are dispensed in order to keep an accurate and uniform cell gap between the upper and lower substrates. Accordingly, spacers have to be dispensed on substrates with a uniform density. There are two ways for dispensing spacers. One is a wet dispensing method which includes spraying a mixture of alcohol and spacers, for example; and the other is a dry dispensing method which includes spraying only spacers.

In the fourth step (ST4), the upper and lower substrates are aligned and attached to each other. An aligning error margin in this case is less than a few micrometers. If the upper and lower substrates are aligned and attached with an aligning margin larger than the error margin discussed above, display quality of the liquid crystal display is deteriorated due to a leakage of light during operation of the liquid crystal cell.

In the fifth step (ST5), the liquid crystal cell fabricated in the above steps is cut into individual liquid crystal cells. The cutting process includes a step of scribing by which cutting lines are formed on the substrate and a step of breaking, in which the substrate is severed along the scribed lines.

In the sixth step (ST6), liquid crystal material is injected into individual liquid crystal cells. Since each individual liquid crystal cell has a gap of only a few micrometers between the substrates per hundreds of square centimeters in area, a vacuum injection method using a pressure difference is widely used for injecting liquid crystal material into this liquid crystal cell. In general, because the injection process of the liquid crystal material into the cells takes the longest time among many fabrication processes for the liquid crystal display device, it is important to optimize the vacuum injection in order to increase the fabrication yield. After the liquid crystal material is injected to the liquid crystal cell, the injection hole needs to be sealed. The injection hole is usually sealed by forming an ultraviolet light curable resin on the injection hole and irradiating an ultraviolet light to the sealed hole. Because inferior goods may be produced by contaminations if the liquid crystal cell is exposed to the air, the liquid crystal cell must be protected from the air and must not be left in the air for a long time when it is not sealed.

After the injection and sealing process, the liquid crystal cell undergoes inspection and grinding processes. In the inspection process, the existence of contaminations in the liquid crystal cell, of point defects caused by an inferiority of the thin film transistor, of line defects caused by severance of the gate and data line, and of defective optical properties caused by a difference of a cell thickness, for example, are inspected.

A conventional injection process for the liquid crystal cell and the degree of the injection in the liquid crystal panel will be explained hereinafter with reference to FIG. 2 and FIGS. 3A to 3C. FIG. 2 is a schematic diagram illustrating a conventional injection process of the liquid crystal and more particularly illustrating the vacuum injection method whereby the liquid crystal material is injected in a vacuum chamber using a pressure difference between the interior and exterior of the liquid crystal cell. Though this injection process is usually executed using a cell cassette that loads a number of liquid crystal panels at one time, the injection process will be described on the basis of one liquid crystal panel for the sake of convenience. As shown in the FIG. 2, a vacuum chamber 2 has an inlet 4, an outlet 6 for nitrogen gas, and a container 10 having the liquid crystal 8 therein. The liquid crystal panel 14 having the injection hole 12 is disposed over the container 10 in the vacuum chamber 2. The seal pattern 13 is formed along internal edges of the liquid crystal panel 14 except the injection hole 12. The seal pattern is needed to form the cell gap for the injection of the liquid crystal and to prevent the leakage of the liquid crystal. Before the injection process is commenced, the interior of the liquid crystal panel 14 should be vacuumed and an autoclave process removing air bubbles in the liquid crystal should be executed. If the liquid crystal with air bubbles is injected into the liquid crystal panel, inferior goods may be produced. If the pressure is changed rapidly to reduce the injection time, the liquid crystal 8 may be altered and the liquid crystal panel 14 may be deformed and damaged.

After air bubbles that exist in the liquid crystal panel 14 and in the liquid crystal 8 are adequately removed, the injection hole 12 of the liquid crystal panel 14 is dipped into the container 10. At this time, if the interior of the liquid crystal panel 14 is kept in a vacuum state of about 1/1000 Torr, the liquid crystal 8 in the container 10 is drawn into the interior of the liquid crystal panel 14 through capillary action. When the liquid crystal panel 14 is filled with the liquid crystal 8 to a certain degree, nitrogen gas ($N_2$) is supplied through the inlet 4 to cause a pressure difference between the interior and exterior of the liquid crystal panel 14. Accordingly, the liquid crystal fills the rest in the gap of the liquid crystal panel.

FIGS. 3A to 3C are schematic diagrams illustrating a movement of the liquid crystal injected in stages according to the injection degree of the conventional liquid crystal panel 14. As described in FIG. 2, the conventional injection process of the liquid crystal is executed using capillary action and the pressure difference. FIG. 3A shows an early stage of the liquid crystal injection. When the injection hole 12 of the liquid crystal panel 14 contacts the liquid crystal 8, the liquid crystal 8 starts to permeate into the liquid crystal panel 14 by capillary action. FIG. 3B shows an intermediate stage of the liquid crystal injection. As shown in the figure, a front surface of the liquid crystal moving upward forms a curved surface because of surface tension, and the liquid crystal fills more than half of the liquid crystal panel 14. FIG. 3C shows a last stage of the liquid crystal injection. At the last stage of the liquid crystal injection, nitrogen gas is supplied to the vacuum chamber to induce a pressure difference between the interior and exterior of the liquid crystal panel as described in FIG. 2, and accordingly, the liquid crystal comes to fill the rest of the liquid crystal panel left vacant using the pressure difference. However, when the liquid crystal 8 fills the liquid crystal panel 14 to a certain degree, the shape of the front surface of the liquid crystal moving upward is changed from the curved surface to a flat surface due to an equilibrium between the capillary climbing power of the liquid crystal and gravity, and thus the speed of the liquid crystal injection slows down suddenly. This phenomenon becomes more serious as the size of the liquid crystal panel is larger. Due to the general trend in the industry, the size of the liquid crystal panel has a tendency to increase. Accordingly, those problems described above should be avoided to increase a production yield of the liquid crystal display device.

SUMMARY OF THE INVENTION

Accordingly, the present invention is directed to a liquid crystal panel for a liquid crystal display device that substantially obviates one or more of problems due to limitations and disadvantages of the related art.

An object of the present invention is to provide a liquid crystal panel, which has ribs therein in order to reduce an injection time of the liquid crystal and thus increase a production yield of the liquid crystal display device.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal panel for a liquid crystal display device comprises an upper substrate having color filters and black matrices, a lower substrate having array elements, a seal pattern between the upper and lower substrates, the seal pattern having an injection hole, a liquid crystal between the upper and lower substrates, and a plurality of ribs on an internal edge facing the injection hole. The ribs are disposed on a region where black matrices are formed and have a shape of the teeth of a comb. In addition, an acryl-based resin is selected for a material used for the ribs.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Reference will now be made in detail to an embodiment of the present invention, which is illustrated in the accompanying drawings.

Figure 4:
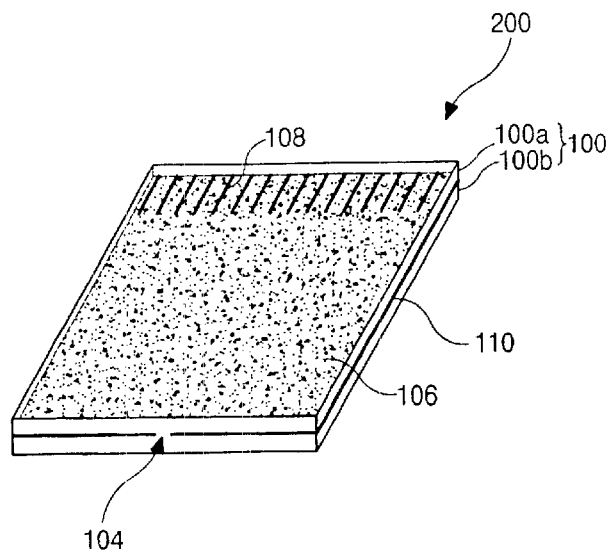
FIG. 4 is a simplified plan view illustrating a part of a liquid crystal panel for a liquid crystal display device.

FIG. 4 is a simplified plan view illustrating a part of a liquid crystal panel for a liquid crystal display device and only a region whereto a liquid crystal is injected is shown in the figure for convenience sake. As shown in the figure, a liquid crystal panel 200 for a liquid crystal display device according to the present invention comprises an upper substrate 100a having color filters and black matrices (not shown) thereon, a lower substrate 100b having array elements (not shown) thereon, a seal pattern 110 disposed between the upper and lower substrates and having an injection hole 104, a liquid crystal 106 injected between the upper and lower substrate through the injection hole 104 of the seal pattern 110, and a plurality of ribs 108 disposed on an internal edge of the liquid crystal panel 100 facing the injection hole 104. The ribs may be formed on a region of one of the substrates where incident light is intercepted, and they may be formed on the region where black matrices are formed. The ribs provide increased contact area with the liquid crystal and maximize a capillary action, thereby preventing a slow down of an injection speed of the liquid crystal at the last stage of an injection. The ribs 108 may be formed by a photolithographic process, and may be made of a photosensitive material such as an acryl-based resin which is a photo resin material.

Figure 1:
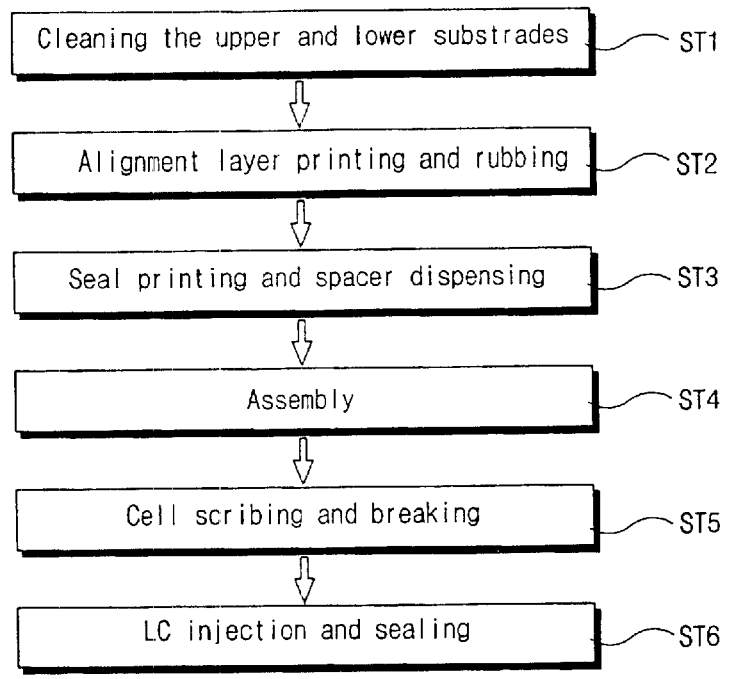
FIG. 1 is a flow chart illustrating a fabricating sequence of liquid crystal cells for the conventional liquid crystal display device.
Figure 2:
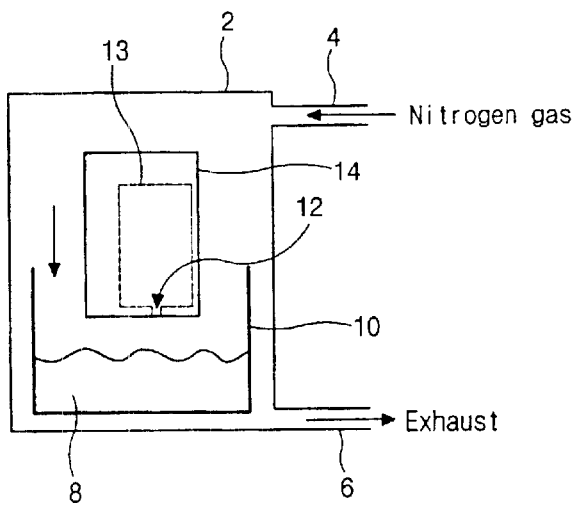
FIG. 2 is a schematic diagram illustrating a conventional injection process of liquid crystal.
Figure 3A:
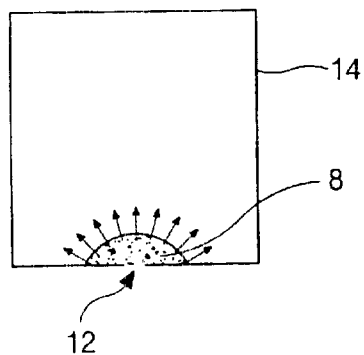
FIGS. 3A to 3C are schematic diagrams illustrating movements of the liquid crystal injected by stages according to the injection degree of a conventional liquid crystal panel.
Figure 3B:
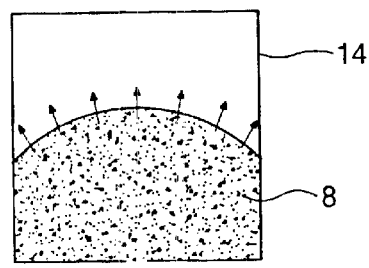
Figure 3C:
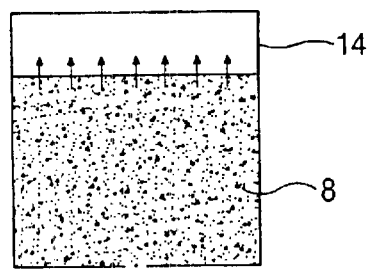
Figure 5A:
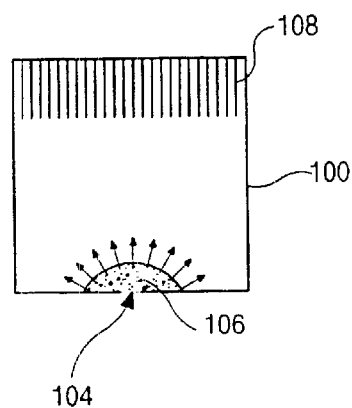
FIGS. 5A to 5C are schematic diagrams illustrating movements of the liquid crystal injected by stages according to the injection degree of the liquid crystal panel of the present invention.
Figure 5B:
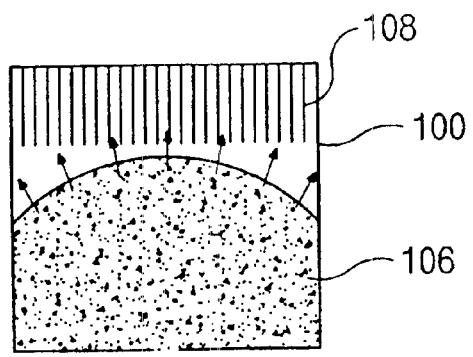

FIGS. 5A and 5B shows early and intermediate stages of the liquid crystal injection according to the present invention. At these stages the liquid crystal panel is filled with the liquid crystal using the capillary action described with respect to FIGS. 3A and 3B.

Figure 5C:
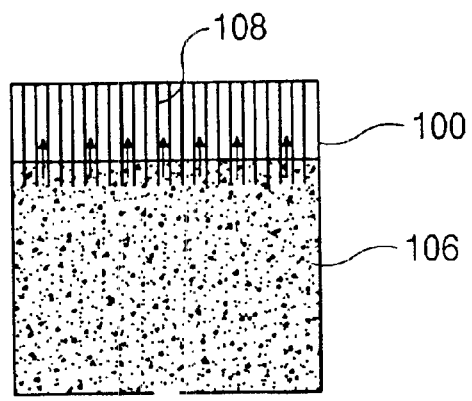

FIG. 5C shows a last stage of the liquid crystal injection. When more than half of the liquid crystal panel 100 is filled with the liquid crystal 106, the shape of the advancing surface of the liquid crystal is changed from a curved surface to a flat surface. When the liquid crystal 106 moving upward contacts the ribs 108 disposed in an upper part of the liquid crystal panel 100, the liquid crystal 106 permeates into a space between each rib 108 by maximizing the surface tension between the liquid crystal 106 and the rib 108. Accordingly, the liquid crystal 106 fills the rest of the interior of the liquid crystal panel 100 quickly using capillary action. The liquid crystal injection method according to the present invention may be used in various modes such as Twisted Nematic (TN), In Plane Switching (IPS), Ferroelectric Liquid Crystal (FLC) and Vertical Alignment (VA) mode, for example.

It will be apparent to those skilled in the art that various modifications and variation can be made in the fabrication and application of the present invention without departing from the spirit or scope of the invention. Thus, it is intended that the present invention cover the modifications and variations of this invention provided they come within the scope of the appended claims and their equivalents.

What is claimed is:

1. A liquid crystal panel for a liquid crystal display device comprises:
   an upper substrate having color filters and black matrices thereon;
   a lower substrate having array elements;
   a seal pattern between the upper and lower substrates, the seal pattern having an injection hole;
   a liquid crystal between the upper and lower substrates; and
   a plurality of ribs on an internal edge of the seal pattern opposite the injection hole, whereby the plurality of ribs maximize the surface tension between the liquid crystal and rib when the liquid crystal is injected through the injection hole.

2. The liquid crystal panel according to claim 1, wherein the ribs are disposed in a region corresponding to black matrices.

3. The liquid crystal panel according to claim 1, wherein the ribs include an acryl-based resin.

4. The liquid crystal panel according to claim 1, wherein the ribs have a shape of teeth of a comb.

5. A method of injecting liquid crystal material into a liquid crystal panel, comprising:
   injecting a liquid crystal material through an injection hole into a gap formed between an upper substrate and a lower substrate of the liquid crystal panel; and
   forming a plurality of ribs within the gap opposite the injection hole such that the liquid crystal material initially contacts the plurality of ribs when a shape of an advancing surface of the injected liquid crystal changes due to an equilibrium between a capillary action of the injected liquid crystal material and gravity.

6. The method of injecting liquid crystal material according to claim 5,
   wherein the injection hole is formed in a seal pattern between the upper substrate and the lower substrate.

7. The method of injecting liquid crystal material according to claim 5,
   wherein the liquid crystal material is injected into the gap through the injection hole by capillary action.

8. The method of injecting liquid crystal material according to claim 5,
   wherein the liquid crystal material completely fills the gap by capillary action of the liquid crystal material in contact with the plurality of ribs.

9. The method of injecting liquid crystal material according to claim 5, wherein the shape of an advancing surface of the liquid crystal material changes from a curved shaped to a flat shape when more than half of the liquid crystal panel is injected with the liquid crystal material.

10. The method of injecting liquid crystal material according to claim 5,
    wherein the upper substrate includes color filters and black matrices; and the lower substrate includes array elements.

11. The method of injecting liquid crystal material according to claim 5, wherein the ribs are disposed on a region where the black matrices are formed.

12. The method of injecting liquid crystal material according to claim 5, wherein the ribs are formed of an acryl-based resin.

13. A liquid crystal panel for a liquid crystal display device, comprising:
    an upper substrate;
    a lower substrate;
    a seal pattern formed between the upper and lower substrates, the seal pattern having an injection hole;
    a liquid crystal formed between the upper and lower substrates; and
    a plurality of ribs on an internal edge of the seal pattern opposite the injection hole, whereby the plurality of ribs maximize the surface tension between the liquid crystal and rib when the liquid crystal is injected through the injection hole.

14. The liquid crystal panel according to claim 13, wherein the ribs are disposed in a region corresponding to black matrices.

15. The liquid crystal panel according to claim 13, wherein the ribs include an acryl-based resin.

16. The liquid crystal panel according to claim 13, wherein the ribs have a shape of teeth of a comb.

17. A method of filling a gap in a liquid crystal panel with liquid crystal material, comprising:

injecting a liquid crystal material into a gap formed between an upper substrate and a lower substrate of the liquid crystal panel; and filling the gap with the liquid crystal material using a plurality of ribs formed between the upper substrate and lower substrate, wherein the plurality of ribs maximize the surface tension between the liquid crystal and rib when the liquid crystal is injected through the injection hole.

18. A liquid crystal panel for a liquid crystal display device, comprising:

an upper substrate;

a lower substrate;

a seal pattern formed between the upper and lower substrates, the seal pattern having an injection hole of a first width;

a liquid crystal material between the upper and lower substrates; and a plurality of ribs on an internal edge of a portion of the seal pattern opposite the injection hole, wherein the plurality of ribs project toward the injection hole, wherein the plurality of ribs are evenly distributed for a second width along the internal edge, and wherein first width is less than the second width.

19. The liquid crystal panel for a liquid crystal display device according to claim 18, wherein the plurality of ribs are disposed in a region corresponding to black matrices.

20. The liquid crystal panel for a liquid crystal display device according to claim 18, wherein the plurality of ribs include an acryl-based resin.

21. A liquid crystal panel for a liquid crystal display device comprises:

an upper substrate having color filters and black matrices thereon;

a lower substrate having array elements;

a seal pattern between the upper and lower substrates, the seal pattern having an injection hole;

a liquid crystal between the upper and lower substrates; and a plurality of ribs on an internal edge of the seal pattern opposite the injection hole, the plurality of ribs projected toward the injection hole to a predetermined length, wherein the predetermined length is a length at which, upon an injection of the liquid crystal through the injection hole, the plurality of ribs initially contact the liquid crystal when a shape of an advancing surface of the injected liquid crystal changes due to an equilibrium between a capillary action of the injected liquid crystal and gravity.

22. A liquid crystal panel for a liquid crystal display device, comprising:

an upper substrate;

a lower substrate;

a seal pattern formed between the upper and lower substrates, the seal pattern having an injection hole;

a liquid crystal formed between the upper and lower substrates; and a plurality of ribs on an internal edge of the seal pattern opposite the injection hole, the plurality of ribs projected toward the injection hole to a predetermined length, wherein the predetermined length is a length at which, upon an injection of the liquid crystal through the injection hole, the plurality of ribs initially contact the liquid crystal when a shape of an advancing surface of the injected liquid crystal changes due to an equilibrium between a capillary action of the injected liquid crystal and gravity.

23. A method of filling a gap in a liquid crystal panel with liquid crystal material, comprising:

injecting a liquid crystal material into a gap formed between an upper substrate and a lower substrate of the liquid crystal panel; and filling the gap with the liquid crystal material using a plurality of ribs formed between the upper substrate and lower substrate, wherein the liquid crystal material initially contacts the plurality of ribs when a shape of an advancing surface of the injected liquid crystal changes due to an equilibrium between a capillary action of the injected liquid crystal and gravity.

* * * * *